United States Patent
Wontner

[11] Patent Number: 5,980,411
[45] Date of Patent: Nov. 9, 1999

[54] PROCESS FOR CONTROLLING THE COUPLINGS OF A HYDROSTATIC AND MECHANICAL TORQUE DIVISION GEARING

[75] Inventor: Gebhard Wontner, Wolfern, Austria

[73] Assignee: Steyr-Daimler-Puch Aktiengesellschaft, Vienna, Austria

[21] Appl. No.: 09/171,957

[22] PCT Filed: Apr. 29, 1997

[86] PCT No.: PCT/AT97/00082

§ 371 Date: Oct. 29, 1998

§ 102(e) Date: Oct. 29, 1998

[87] PCT Pub. No.: WO97/41370

PCT Pub. Date: Nov. 6, 1997

[30] Foreign Application Priority Data

Apr. 30, 1996 [AT] Austria ..................................... 778/96

[51] Int. Cl.⁶ .................................................. F16H 47/04
[52] U.S. Cl. .................................................. 475/76; 475/79
[58] Field of Search ...................... 475/76, 78, 79, 475/81

[56] References Cited

U.S. PATENT DOCUMENTS

| | | |
|---|---|---|
| 4,519,274 | 5/1985 | Maruyama et al. . |
| 4,776,233 | 10/1988 | Kita et al. . |
| 4,983,149 | 1/1991 | Kita .......................................... 475/76 |
| 5,129,867 | 7/1992 | Fredriksen et al. ........................ 475/79 |
| 5,146,812 | 9/1992 | Nikolaus et al. . |
| 5,207,736 | 5/1993 | Fredriksen . |
| 5,343,779 | 9/1994 | Nikolaus et al. . |
| 5,605,515 | 2/1997 | Fredriksen . |
| 5,624,339 | 4/1997 | Coutant et al. ........................... 475/72 |
| 5,730,678 | 3/1998 | Larkin ....................................... 475/81 |

Primary Examiner—Dirk Wright
Attorney, Agent, or Firm—Bachman & LaPointe, P.C.

[57] ABSTRACT

A method of changing the range of a hydrostatic/mechanical power split transmission is specified: firstly, the command to engage the clutch for the next range is given, then the transfer of the load to this clutch is carried out and then the command to disengage the clutch for the old range $(V_x)$ is given if, during the load transfer, a characteristic speed value of the summing planetary gearbox (10), for example the speed of the planet carrier (25), remains constant. In this way, the sensors for the clutches are dispensed with and quicker changes of range are made possible.

5 Claims, 3 Drawing Sheets

PROCESS FOR CONTROLLING THE COUPLINGS OF A HYDROSTATIC AND MECHANICAL TORQUE DIVISION GEARING

BACKGROUND OF THE INVENTION

The invention deals with a method of controlling a hydrostatic/mechanical power split transmission, which comprises an adjustable hydrostat unit, a multiple shaft summing planetary gearbox for combining the mechanical path and hydrostatic path, and a step gearbox connected downstream in order to form gear change ranges which adjoin one another at synchronization points and which are passed through by means of adjusting the hydrostat unit, it being the case that, at each change from an old range to a next range, firstly, when the synchronization speed is reached, the command to engage the clutch for the next range is given, then the transfer of the load from the clutch for the old range to the clutch for the next range is performed by adjusting the hydrostat unit, and only then is the command to disengage the clutch for the old range given.

In such transmissions, the clutches are generally switched hydraulically. Changes of range are performed in several steps, several clutches and the hydrostat being actuated in a specific sequence and depending on state signals or completion messages. The control needs a feedback signal for the actual position of specific clutches. The actuation signal is not sufficient, since there could certainly also be a defective clutch or a pressure line could be leaky, so that the clutch is not engaged, in spite of the "completion message". In the case of a claw coupling the two halves of the coupling could also be exactly claw to claw, or a selector lever could have become stuck.

EP 280 757-A1 discloses, in an embodiment of such a transmission, the practice of connecting the pressure signal line to the clutches to a pressure sensor or pressure switch via branch lines. In the case of this known transmission, in the course of a range change following the command to engage the clutch assigned to the next range and, once more following the command to disengage the clutch assigned to the preceding range, the feedback signal from the respective pressure sensor or pressure switch is awaited before the next step of the range change is executed.

On the one hand, this double wait prolongs the duration of a range change and, during sharp acceleration, leads to a brief drop in the acceleration, particularly if the pressure switches are connected to their clutch via long lines. On the other hand, the failure risk of pressure switches of this type, which occur in large numbers for this purpose (in the case of a transmission with four ranges, six clutches are generally needed), is considerable. Although pressure sensors are more secure, truly reliable sensors, or ones which can be checked in operation, are expensive. The consequence of a wrong state signal is at least that range changes are no longer possible.

These problems arise irrespective of the type of clutches used (these may be claw couplings, tooth couplings, synchronization clutches or multiplate clutches) and irrespective of the type of step gearbox connected downstream of the summing planetary gearbox. It therefore arises even in the case of a transmission according to U.S. Pat. No. 5,207,736 where, instead of the pressure of the clutch actuation, the position of the selector cuffs can be interrogated by means of sensors.

It is thus the object of the present invention to specify a control method which accelerates the sequence of range changing, while completely maintaining the operational reliability, and manages without pressure switches or pressure sensors and is thus more cost-effective.

SUMMARY OF THE INVENTION

According to the invention, this is achieved by the command to disengage the clutch for the old range being given if and only if it is established that, during the load transfer, a characteristic speed value of the summing planetary gearbox remains constant.

It is thus primarily detected whether the clutch is also actually engaged and there is no longer any monitoring gap between command and execution. Since, in addition, it is not necessary to wait for a feedback signal, the range change is executed in the minimum time and without any brief drop in the acceleration. Furthermore the many and costly and/or expensive pressure switches or pressure sensors or position sensors are dispensed with. Only one or two pulse generators for measuring the rotational speed are necessary, but these are mostly present in any case in order to supply the signals needed for the control. In such cases, the introduction of the inventive method requires no changes at all in the transmission. Furthermore, the method is based on kinematic laws which apply in the transmission, that is to say is very precise. The only possible deviation lies in tooth play during the transfer of the load. However, this is negligibly small and in any case lies within the bandwidth even of a precise measurement of speed.

In the case of a hydrostatic/mechanical power split transmission, in which the summing planetary gearbox has a sun wheel driven by the hydrostatic path, an internal gear driven by the mechanical path, and a planet carrier, the characteristic speed value is the speed of the planet carrier. This results in the advantage that only a single speed signal is needed. A pulse generator or rotational speed sensor for the planet carrier or for an element connected directly to it is already present for control purposes. Furthermore, it is advantageous that the planet carrier rotates even when the vehicle is at a standstill, so that an accurate speed signal is thus always available.

In the case of a hydrostatic/mechanical power split transmission in which the summing planetary gearbox is a double planetary gearbox with a first input shaft driven by the hydrostatic path, a second input shaft driven by the mechanical path, and two output shafts, each connected to an element in the double planetary gearbox, the characteristic speed value is the difference between the speeds of the two output shafts. The two speed signals required here are also relatively easy to obtain, since both output shafts carry gearwheels, and the formation of the difference can be executed in a very simple way.

In addition, the method is preferably carried out in such a way that, it the characteristic speed value of the summing planetary gearbox changes during the load transfer, the command to disengage the clutch for the old range is not given, the engage command for the next clutch is withdrawn and the hydrostat unit is adjusted again in the direction of a transfer of the load to the clutch for the old range. Relieving the load on the clutch, which takes place during this process, means that the clutch will often nevertheless engage.

Furthermore, it is within the scope of the method, after the load has been transferred to the clutch for the old range, to repeat the range change with the command to engage the clutch for the next range. As a result, the driver does not need to intervene; it is attempted once more automatically. This is primarily advantageous in the case of claw couplings, since the probability that the halves of the coupling will be tooth to tooth twice in succession is extremely low.

BRIEF DESCRIPTION OF THE DRAWINGS

In the following text the invention will be described and explained with reference to drawings, in which.

DETAILED DESCRIPTION

Figure 1:
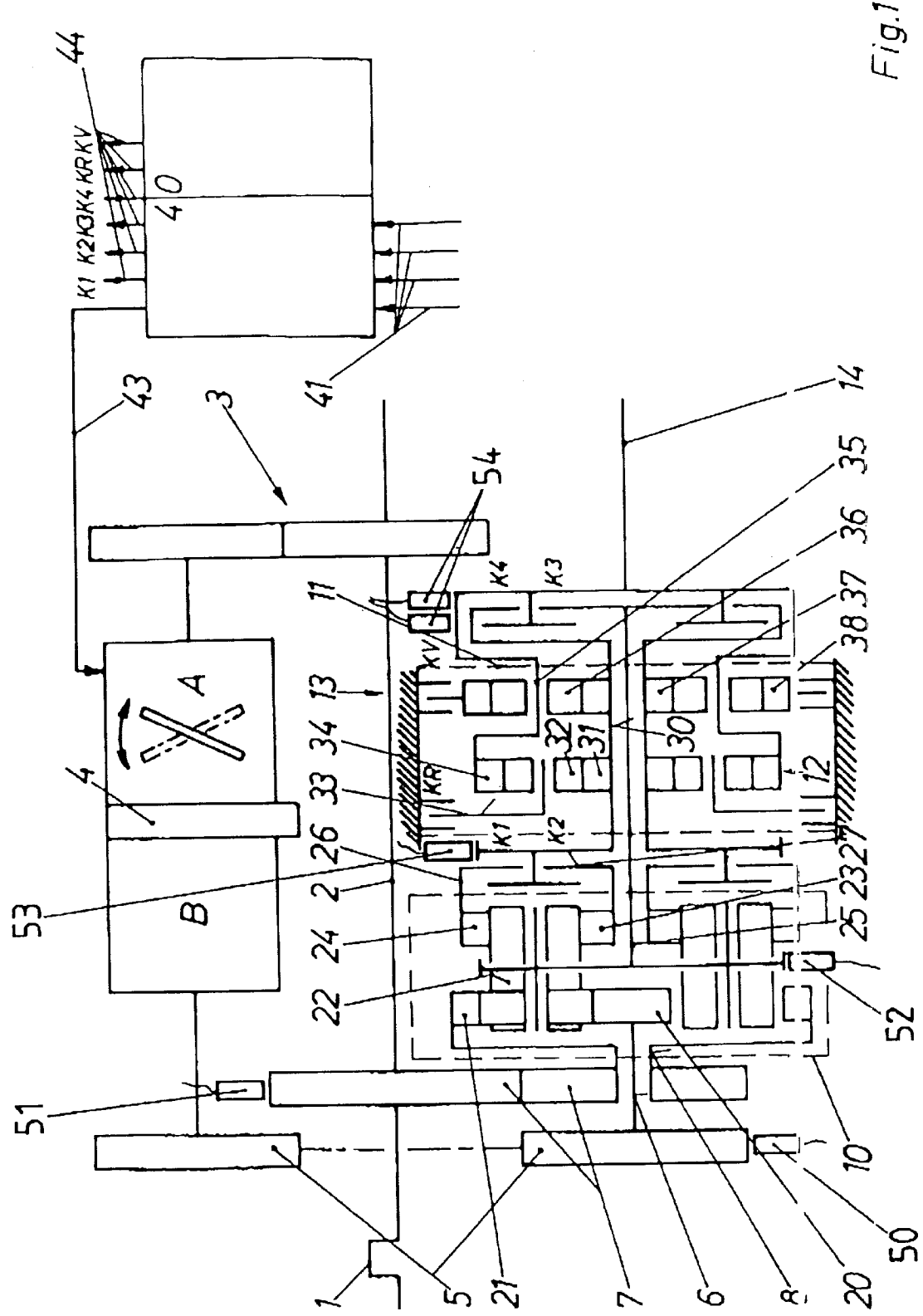
FIG. 1 illustrates a transmission schematic drawing of an embodiment of a transmission in which the inventive method can be applied.

In FIG. 1, the engine 1, for example an internal combustion engine, is only indicated. It drives a gearbox input shaft without an interposed clutch. For its part, said gearbox input shaft drives, via a first gear transmission 3, a controllable hydrostat unit 4, whose output drives a first input shaft 6 via a second gear transmission 5. On the other side, the gearbox input shaft 2 drives a second input shaft 8 via a third gear transmission 7. The hydrostat unit 4 comprises two hydrostatic machines A, B, of which one always operates as a motor and one as a pump. The machine A is continuously controllable in both directions of rotation.

The two input shafts 6, 8 are part of a summing planetary gearbox 10 from which, via clutches K1, K2, a step gearbox 11 is driven, which here comprises a first planetary gearbox stage 12 having a clutch KR (more precisely: a brake) and a second planetary gearbox stage 13 having a clutch (more precisely: a brake) KV. An output drive shaft 14, which serves for example to drive a vehicle, is engaged via clutches K3, K4.

The summing planetary gearbox 10 contains a first sun 20, a first internal gear 21 and graduated planets 22, which form the first planet set. The second planet set comprises a second sun 23, an internal gear 24 and the graduated planets 22, which are common to both sets. The planets 22 are mounted on a planet carrier 25, whose shaft 25' constitutes the first output shaft from the summing planetary gearbox 10. The second internal gear 24 acts on the clutch K1 via an internal gear shaft 26 and constitutes the second output shaft. The second sun 23 acts on the clutch K2 via a sun shaft 27 and constitutes the third output shaft from the summing planetary gearbox 10.

The first stage 12 of the step gearbox 11 comprises a first sun wheel 31, first planet wheels 32, a first planet carrier 33 and a first annular gear 34. The sun wheel shaft 30 is optionally driven by one of the two clutches K1, K2, and the first planet carrier 33 can be firmly braked by means of the clutch KR on the stationary housing. The first annular gear 34 is rotationally fixedly connected to a second planet carrier 35 of the second planetary gearbox stage 13. Its planet wheels 36 mesh on the inside with a second sun wheel 37, which is rotationally fixedly connected to the sun wheel shaft 30, 6, 21 and mesh on the outside with a second annular gear 38, which can be firmly braked via the clutch KV on the housing. The output drive shaft 14 is rotationally fixedly connected to the second planet carrier 35 and, via the clutches K3, K4, can be rotationally fixedly connected either to the planet carrier shaft 25 or to the sun wheel shaft 30.

In addition, a controller 40 is indicated. This receives a load or speed predefinition from an accelerator pedal 42, measured operating and driving parameters via signal lines 41 and speed signals from pulse generators 50 to 54, to be specific 50: hydrostat 4, 51: drive motor 1, 52: planet carrier 25, 53: sun shaft 27, 54: second planet carrier 35, doubled in order to determine the direction of rotation.

From these signals, the controller 40 forms control signals for the hydrostat 4, which are transmitted to the latter via the control line 43, and control signals 44 for the clutches K1, K2, K3, K4, KR, KV. The signal from the pulse generator 52 is also used in the controller 40 for the inventive check to see whether the respective clutch is engaged.

Figure 2:
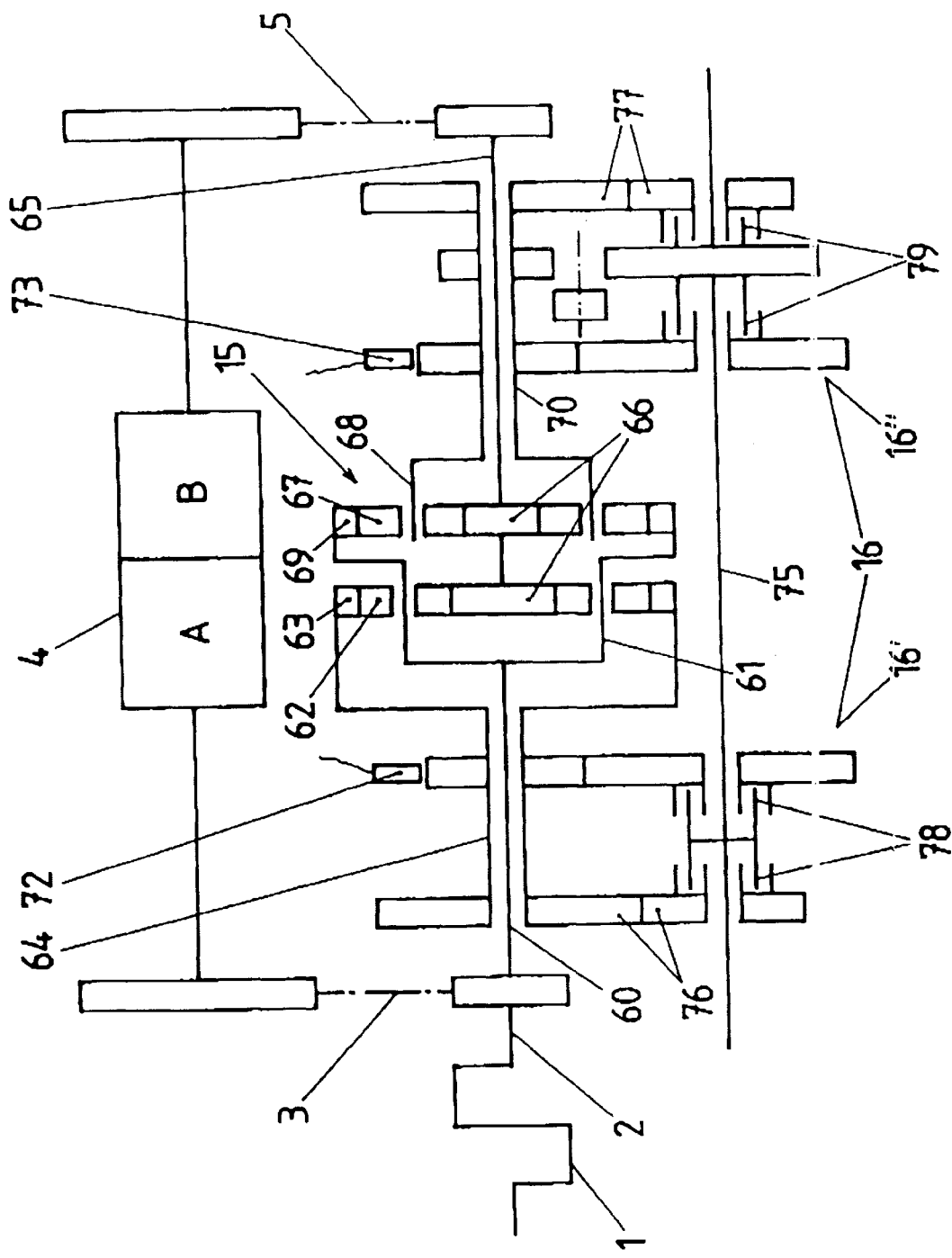
FIG. 2 shows a transmission schematic drawing of a further embodiment of a transmission in which the inventive method can be applied.

In the modified transmission illustrated in FIG. 2, the engine is again designated by 1, the drive shaft by 2, the hydrostat by 4, its drive by 3 and its output drive by 5. The summing planetary gearbox 15 has four shafts, and the step gearbox 16 connected to it in the power flow direction comprises two parts 16', 16".

The mechanical path begins with a first input shaft 60, which is rotationally fixedly connected to a first planet carrier 61. Its first planets 62 mesh with a first internal gear 63, which is coupled to a first output shaft 64. The hydrostatic path includes a second input shaft 65 with a double sun wheel 66, which meshes with the first planets 62 and with second planets 67. These are seated on a planet carrier 68 and mesh with a second internal gear 69. The planet carrier 68 is coupled to a second output shaft 70, the second internal gear 69 is coupled to the first planet carrier 61. A first pulse generator 72 and second pulse generator 73 are provided for measuring the speed of the first output shaft 64 and second output shaft 70.

The first and second output shafts 64, 70, together with their gearwheels, already belong to the downstream step gearbox 16; a transmission output shaft 75 is used, for example, to drive the (not illustrated) wheels of a motor vehicle. 76 denotes a gear stage of one part 16' and 77 denotes one of several gear stages of the other half 16" of the step gearbox. These and further gear stages (not designated) are connected to the gearbox output shaft 75 via a first clutch 78 and a second clutch 79 and further clutches.

Figure 3:
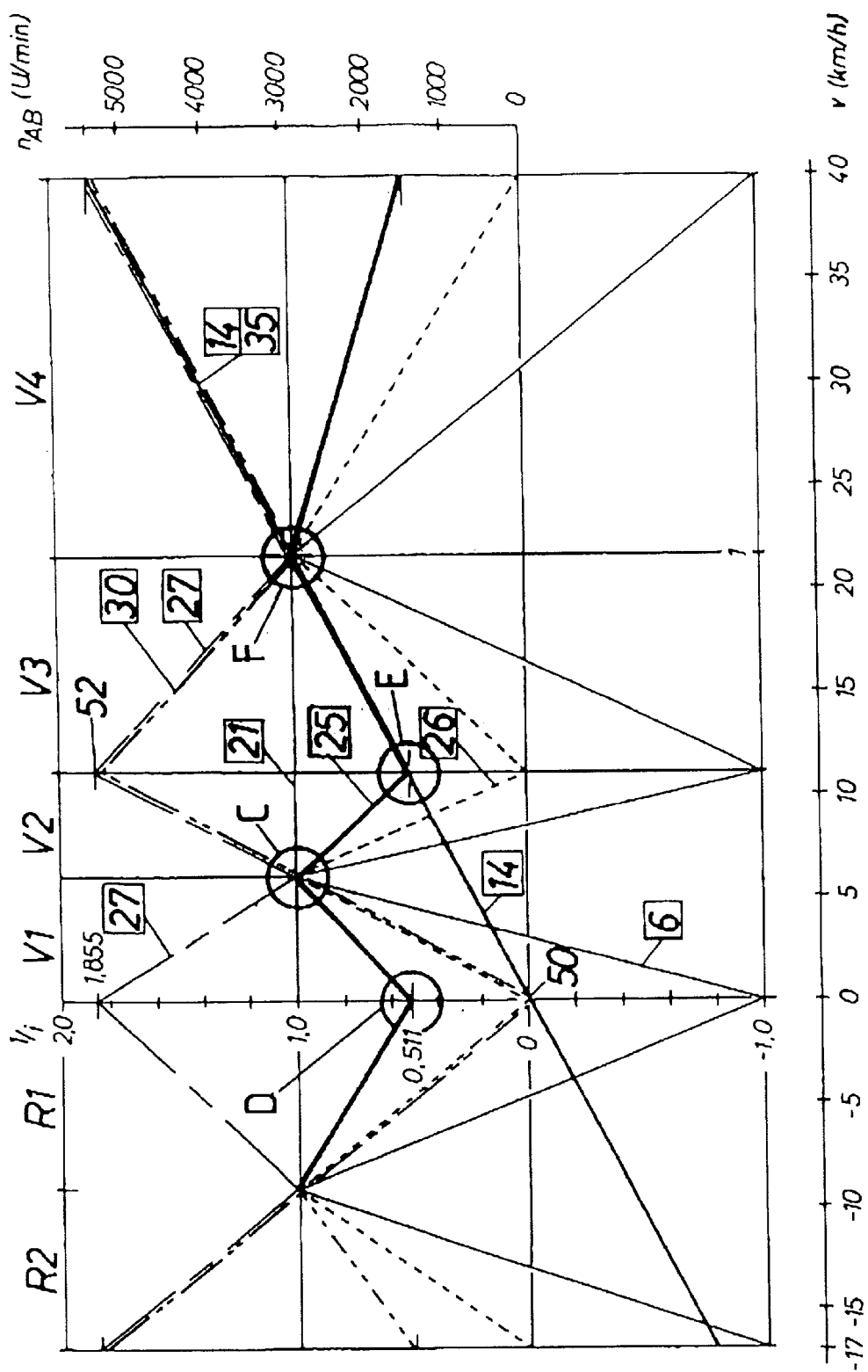
FIG. 3 shows a speed diagram relating to the transmission of FIG. 1.

The inventive control method will now be illustrated using the speed diagram of FIG. 3. Plotted on the abscissa is the speed of the vehicle; the output speeds of a transmission according to FIG. 1 are plotted on the ordinate. The control positions of the hydrostat are plotted on the abscissa corresponding to speed 0. At the horizontal top edge of the picture it is possible to see the ranges, and the respective range limits are plotted by means of a vertical line. Each range corresponds to a specific position of the clutches and therefore to a stage of the step gearbox.

The various straight lines in the diagram correspond to the speeds of the transmission elements, in each case designated within a border, therefore 25 denotes the speed of the planet carrier 25 of the summing planetary gearbox. It can be seen that this set of lines has a discontinuity at each range limit. These discontinuities are circled and designated by C, D, E and F. This discontinuity means that, during the range change, the speed of this element remains unchanged. In a greatly enlarged illustration, it would be possible to see that they are holding points, which begin when the synchronization speed is reached and end again when the synchronization speed is left, thus when the clutch corresponding to the old gear is disengaged. The inventive method makes use of this special feature of transmissions of this type.

It is worth paying particular attention to the fact that the inventive check is possible without any constructional changes; the pulse generators required are already present in many cases. Only an appropriate change to the control commands stored in the controller 40 is necessary.

I claim:

1. A method of controlling a hydrostatic/mechanical power split transmission, which comprises an adjustable hydrostat unit (4), a multiple shaft summing planetary gearbox (10; 15) for combining the mechanical path and hydrostatic path, and a step gearbox (11; 16) connected downstream in order to form "n" gear change ranges ($V_1$, $V_2$, ..., $V_n$), which adjoin one another at synchronization points and are passed through by means of adjusting the hydrostat unit (4), it being the case that, at each change from an old range ($V_x$) to a next range ($V_{x-1}$; $V_{x+1}$), a) firstly, when the synchronization speed is reached, the command to engage the clutch for the next range ($V_{x-1}$; $V_{x+1}$ is given, b) then the transfer of the load from clutch for the old range ($V_x$) to the clutch for the next range ($V_{x-1}$; $V_{x+1}$) is performed by adjusting the hydrostat unit, and c) then the command to disengage the clutch for the old range ($V_x$) is given, wherein the command to disengage the clutch for the old range ($V_x$), is given only if, during the load transfer, a characteristic speed value of the summing planetary gearbox (10) remains constant.

2. The method of controlling a hydrostatic/mechanical power split transmission as claimed in claim 1, the summing planetary gearbox (10) having a sun wheel (20) driven by the hydrostatic path, an internal gear (21) driven by the mechanical path, and a planet carrier (25), wherein the characteristic speed value is the speed of the planet carrier (25).

3. The method of controlling a hydrostatic/mechanical power split transmission as claimed in claim 1, the summing planetary gearbox (15) being a double planetary gearbox with a first input shaft (60) driven by the mechanical path, a second input shaft (65) driven by the hydrostatic path, and two output shafts (64, 71), each connected to an element in the double planetary gearbox, wherein the characteristic speed value is the difference between the speeds of the two output shafts (64, 71).

4. The method of controlling a hydrostatic/mechanical power split transmission as claimed in claim 1, wherein, if the characteristic speed value of the summing planetary gearbox (10; 15) changes during the load transfer, the command to disengage the clutch for the old range ($V_x$) is not given, the engage command for the next clutch is withdrawn and the hydrostat unit (4) is adjusted again in the direction of a transfer of the load to the clutch for the old range ($V_x$).

5. The method of controlling a hydrostatic/mechanical power split transmission as claimed in claim 4, wherein, after the load has been transferred to the clutch for the old range ($V_x$), the range change is repeated with the command to engage the clutch for the next range ($V_{x-1}$; $V_{x+1}$).

* * * * *